United States Patent [19]

Itoh

[11] Patent Number: 5,079,556
[45] Date of Patent: Jan. 7, 1992

[54] COHERENT PULSE RADAR SYSTEM
[75] Inventor: Shin-Ichi Itoh, Tokyo, Japan
[73] Assignee: NEC Corporation, Tokyo, Japan
[21] Appl. No.: 515,654
[22] Filed: Apr. 23, 1990

Related U.S. Application Data

[63] Continuation of Ser. No. 194,204, May 16, 1988, abandoned.

[30] Foreign Application Priority Data

May 14, 1987 [JP] Japan .................... 62-118474

[51] Int. Cl.$^5$ .................. G01S 13/524; G01S 13/20
[52] U.S. Cl. .................... 342/109; 342/112; 342/127; 342/134; 342/159; 342/203
[58] Field of Search .............. 342/109, 127, 110, 111, 342/134, 112, 135, 136, 137, 202, 203, 105, 159

[56] References Cited

U.S. PATENT DOCUMENTS

| | | | |
|---|---|---|---|
| 3,883,871 | 5/1975 | Moore | 342/201 |
| 3,883,873 | 5/1975 | Mosyakov et al. | 342/385 |
| 3,889,261 | 6/1975 | Sirven | 342/127 |
| 3,916,407 | 10/1975 | Bosc et al. | 342/113 |
| 3,972,041 | 7/1976 | Howard | 342/89 |
| 4,012,740 | 3/1977 | Lenneper | 342/428 |
| 4,042,924 | 8/1977 | Evans et al. | 342/102 |
| 4,042,925 | 8/1977 | Albanese et al. | 342/132 |
| 4,057,800 | 11/1977 | Ganz | 342/116 |
| 4,079,376 | 3/1978 | Kirk, Jr. | 342/93 |
| 4,143,373 | 3/1979 | Chernick | 342/88 |
| 4,184,154 | 1/1980 | Albanese et al. | 342/107 |
| 4,241,347 | 12/1980 | Albanese et al. | 342/89 |
| 4,644,356 | 2/1987 | Yamano | 342/160 |
| 4,682,178 | 7/1987 | Anflo et al. | 342/202 |
| 4,684,950 | 8/1987 | Long | 342/94 |
| 4,746,922 | 5/1988 | Prenat | 342/88 |
| 4,797,677 | 1/1989 | MacDoran et al. | 342/352 |
| 4,894,662 | 1/1990 | Counselman | 342/357 |
| 4,916,452 | 4/1990 | Borchert et al. | 342/109 |

OTHER PUBLICATIONS

Skolnik, M. I., "Radar Handbook", o.g., McGraw-Hill, Inc., 1970, pp. 19-13 to 19-17.

Primary Examiner—John B. Sotomayor
Attorney, Agent, or Firm—Foley & Lardner

[57] ABSTRACT

A coherent pulse radar system capable of eliminating a signal associated with a multiple time around path or capable of removing range ambiguity of this multiple time around signal. The radar system includes a device for changing phases of transmitted pulses, for phase detecting received radar pulses with respect to transmitted pulses associated with the present and preceding reception period, and for integrating phase detected signals in a coherent manner.

3 Claims, 9 Drawing Sheets

COHERENT PULSE RADAR SYSTEM

This application is a continuation of application Ser. No. 07/194,204, filed May 16, 1988, now abandoned.

BACKGROUND OF THE INVENTION

This invention relates to a radar system and, more particularly, to a coherent pulse radar system.

Conventionally, a medium pulse repetition frequency (PRF) radar and a high PRF radar are well known with their aspect that the number of transmitted pulses during a predetermined time increases in order to improve the capability of detecting a target and to obtain velocity information of the target. In a radar system of this kind, since the time period between adjacent transmitted pulses (a pulse-repetition interval) becomes short, there is the disadvantage that target extractive ranges, in which a target is unambiguously measured, becomes short.

To eliminate this disadvantage, it is basically necessary to identify a transmitted pulse from which each target echo is yielded. In a prior art method of this type, two pulse-trains respectively having different pulse-repetition frequencies are transmitted sequentially. Thus, at a receiving portion, a target distance can be unambiguously determined by considering time coincidence of target detections on the basis of the respective pulse-trains. Such a method is disclosed in M. I. Skolnich's, "RADAR HANDBOOK" o.g. McGraw-Hill, Inc. 1970, pages, 19 - 13 to 19 - 17.

However, this method has the following disadvantage:

Double transmitting time is necessary since the two different pulse-trains should be transmitted sequentially and since the target detection operation is needed for each pulse-train, in order to determine a target distance.

On the other hand, in signal processing, it is a conventional technique to use integration processing for a plurality of pulses, to overcome a low S/N ratio of a signal. However, the aforementioned prior art does not fully utilize received pulses in such an integration operation.

SUMMARY OF THE INVENTION

Therefore, it is an object of the present invention to provide a coherent pulse radar system capable of eliminating a useless reflected signal associated with a multiple time around signal.

It is another object of the present invention to provide a coherent pulse radar system capable of removing range ambiguity of a multiple time around signal.

According to the present invention, there is provided a coherent pulse radar system comprising means for changing phases of radar transmitted pulses, means for phase-detecting received radar pulses, with reference to phases of transmitted pulses associated with the present reception period and associated with a preceding reception period, to deliver phase-detected pulse signals, and means for integrating said phase-detected signals in a coherent integration manner.

DETAILED DESCRIPTION OF THE PREFERRED EMBODIMENTS OF THE INVENTION

The present invention will be described hereinafter with reference to the drawings.

Figure 1:
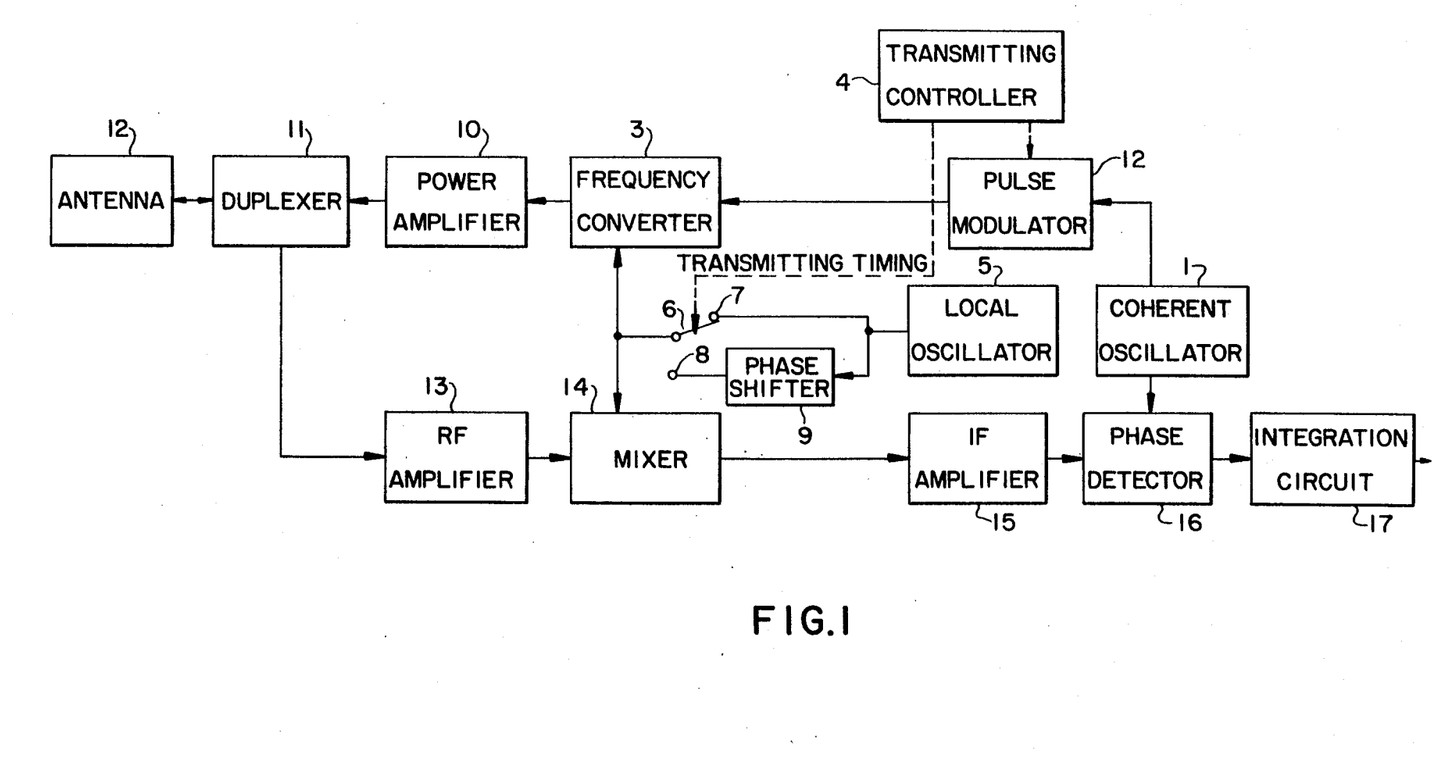
FIG. 1 is a block diagram of a first embodiment according to the present invention.

In FIG. 1 showing a first embodiment of the present invention, a coherent oscillator 1 produces a transmitted intermediate frequency (IF) signal and supplies it to a pulse modulator 2. In the pulse modulator 2, the IF signal is modulated in accordance with a transmitting trigger signal delivered from a transmitting controller 4 and, then, supplied to a frequency converter 3. On the other hand, a local oscillator 5 produces a local frequency signal and supplies it to a terminal 7 of a switcher 6 and to a terminal 8 of the switcher 6 through a phase shifter 9. The phase shifter 9 delays the local frequency signal by $\Delta\phi$. The switcher 6 selects the local frequency signal delivered from the terminal 7 or the delayed local frequency signal delivered from the terminal 8 under the control of a selecting signal delivered from the transmitting controller 4, and supplies the selected local signal to the frequency converter 3.

Therefore, the frequency converter 3 generates a pulse modulated RF signal which corresponds to a frequency-addition signal between the IF signal and the local frequency signal (or the delayed local frequency signal). The pulse modulated RF signal is power-amplified by a power amplifier 10 and supplied through a duplexer 11 to an antenna 12. In this case, the pulse modulated RF signal has a coherent characteristic keeping a predetermined phase relation between transmitted pulses, since it is generated from stable signals produced by the coherent oscillator 1 and the stable local oscillator 5.

An echo (reflected or return) signal from a radar target is received by the antenna 12 and is supplied through the duplexer 11 to an RF amplifier 13. The reflected signal from the RF amplifier 13 is supplied to a mixer 14, together with the local frequency signal delivered from the switcher 6. The mixer 14 generates a received IF signal, which corresponds to a frequency-subtraction signal therebetween, while keeping a phase relation between the reflected signal and the local frequency signal. The received IF signal is amplified by an IF amplifier 15 and supplied to a phase detector 16, together with the transmitted IF signal from the coherent oscillator 1.

Figure 2:
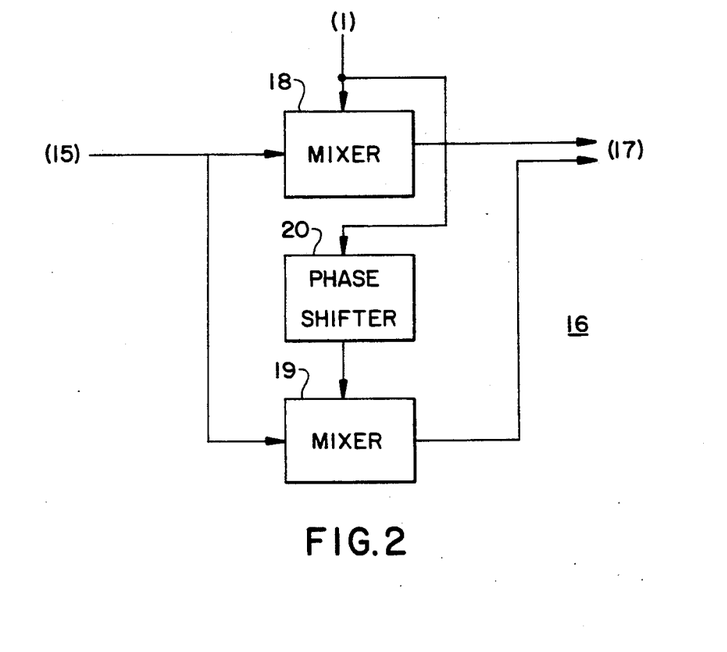
FIG. 2 is a block diagram of a phase detector shown in FIG. 1.

The phase detector 16 produces a ± voltage, i.e., a bipolar video signal indicative of an inphase signal or a quadrature phase signal corresponding to the phase difference between the received IF signal and the transmitted IF signal. FIG. 2 shows a circuit configuration of the phase detector 16. In this figure, the received IF signal from the IF amplifier 15 is supplied to mixers 18 and 19. The transmitted IF signal from the coherent oscillator 1 is supplied to the mixer 18 directly, and to the mixer 19 through a phase shifter 20 which delays the transmitted IF signal by $\pi/2$ (rad). Accordingly, the mixers 18 and 19 deliver the inphase (I) signal and the quadrature (Q) signal, respectively, as the bipolar video signal. Turning back to FIG. 1, the two video signals from the mixers 18 and 19 are supplied to an integration circuit 17. The circuit 17 accumulates the video signals during a predetermined period and delivers an integrated signal by applying a coherent integration process.

Figure 3:
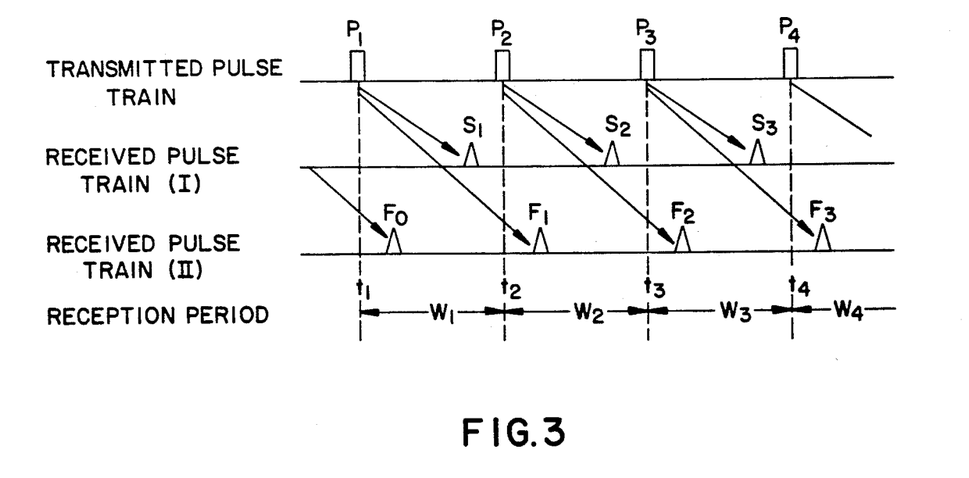
FIG. 3 is a timing chart indicating a time relation between a transmitted pulse train and a reflected pulse train.

FIG. 3 graphically shows a time relation between a transmitted pulse train corresponding to the transmitted IF signal and a received pulse train corresponding to the received IF signal. In FIG. 3, the transmitted pulse train $P_1$, $P_2$, ... located at time points $t_1$, $t_2$ ..., a received pulse train (I) $S_1$, $S_2$, ..., a received pulse train (II) $F_0$, $F_1$, ... and reception periods, $W_1$, $W_2$, ... are indicated. Particularly, when a target exists in the unambiguous range, a reflected signal from the target is received as the received pulse train (I) $S_1$, $S_2$, ..., and when a target exists in an ambiguous range, a reflected signal from the target is received as the received pulse train (II) $F_1$, $F_2$, ..., which corresponds to a second time around signal.

It is assumed that, in FIG. 1, the switcher 6 selects the terminal 7 during a period $\overline{t_1 t_2}$ associated with the transmitted pulse $P_1$ and with the reception period $W_1$, and selects the terminal 8 during a period $\overline{t_2 t_3}$ associated with the transmitted pulse $P_2$ and with the reception sweeping period $W_2$, and that such alternative selection successively continues for every transmitted pulse. Thus, voltages $V_1$ and $V_2$ corresponding to the transmitted pulses $P_1$ and $P_2$ are expressed by complex number indication as follows:

$$V_1 = A \, e^{j(\omega t + \alpha)}$$

$$V_2 = A \, e^{j(\omega t + \alpha - \Delta\phi)}$$

where:
A=an amplitude of the transmitted signal, $\omega$=transmitted angular frequency, t=a time point, $\alpha$=a phase of the transmitted pulse to a reference phase, and $\Delta\phi$=delay of the phase shifter 9.

Similarly, successive voltages $V_3$, $V_4$, ... corresponding to the transmitted pulses $P_3$, $P_4$, ... are expressed as follows:

$$V_1 = V_3 = V_5 \ldots$$

$$V_2 = V_4 = V_6 \ldots$$

On the other hand, voltages $X_1$, $X_2$, $X_3$ ... corresponding to the received pulses (I) $S_1$, $S_2$, $S_3$ ... are expressed under the assumption of a phase delay $\beta$ corresponding to a round-distance between the radar system and a target, as follows:

$$X_1 = X_3 = \ldots = B \, e^{j(\omega t + \alpha - \beta)}$$

$$X_2 = X_4 = \ldots = B \, e^{j(\omega t + \alpha - \Delta\phi - \beta)}$$

where:
B=an amplitude of the received signal.

Further, voltages $Y_1$, $Y_2$, $Y_3$ ... corresponding to the received pulses (II) $F_1$, $F_2$, $F_3$ ... are expressed under the assumption of a phase delay $\gamma$ corresponding to a round-distance between the radar system and a target in the ambiguous range, as follows:

$$Y_1 = Y_3 = \ldots = C \, e^{j(\omega t + \Delta - \gamma)}$$

$$Y_2 = Y_4 = \ldots = C \, e^{j(\omega t + \Delta - \Delta\phi - \gamma)}$$

where:
C=an amplitude of the received signal.

Next, phase detection operation of the received pulses (I) and the received pulses (II) will be described hereinafter. The received pulses $S_1$, $S_3$, ... are phase-detected on the basis of the local IF signal delivered from the terminal 7 of the switcher 6 by the mixer 14. In this case, the phase of the local signal is coincident with that of the voltages $V_1$, $V_3$, .... After this, the received pulses $S_1$, $S_3$ ... delivered from the IF amplifier 15 are further phase-detected on the basis of the transmitted IF signal from the coherent oscillator 1, by the phase detector 16. Therefore, with reference to equations for $X_1$ and $V_1$, output signals $X_1'$, $X_3'$, ... delivered from the mixer 18 can be expressed as the inphase (I) signal as follows:

$$X_1' = X_3' = \ldots = D \cos \beta$$

where
D=a relative amplitude considering respective losses and gains in the system.

Further, output signals $X_1'$, $X_3'$, ... delivered from the mixer 19 can be expressed by the following equation as the quadrature (Q) signal while the phase shifter 20 delays the coherent signal from the coherent oscillator 1 by $\pi/2$ (rad).

$$X_1'' = X_3'' = \ldots = D \sin \beta$$

On the other hand, the received pulses $S_2$, $S_4$, ... are phase-detected on the basis of the local IF signal delivered from the terminal 8 of the switcher 6 by the mixer 14. In this case, the phase of the local signal is coincident with that of the voltages $V_2$, $V_4$, .... Accordingly, the mixers 18 and 19 in the phase detector 16 deliver output signals $X_2'$, $X_4'$, ... and $X_2''$, $X_4''$ ..., respectively, which are expressed as follows:

$$X_2' = X_4' = \ldots = D \cos \beta$$

$$X_2'' = X_4'' = \ldots = D \sin \beta$$

Next, the operation of the integration circuit 17 will be described hereinafter. Sets of the aforementioned inphase (I) signals and the aforementioned quadrature (Q) signals such as $(X_1', X_1'')$, $(X_2', X_2'')$, are supplied to the integration circuit 17. In this circuit, the respective input signals are represented as complex number vectors $X_1^c$, $X_2^c$, $X_3^c$, ... which hold the signal amplitudes and phases and, thus, a coherent integration process becomes realizable by adding vector-voltages of the same phase. With reference to the signals $X_1'$, $X_2'$, ... and $X_1''$, $X_2''$ ..., the input signals of the integration circuit 17 can be expressed by complex number vectors indicative of the complex number as follows:

$$X_1^c = X_2^c = \ldots = D\, e^{j\beta}$$

Figure 4A:
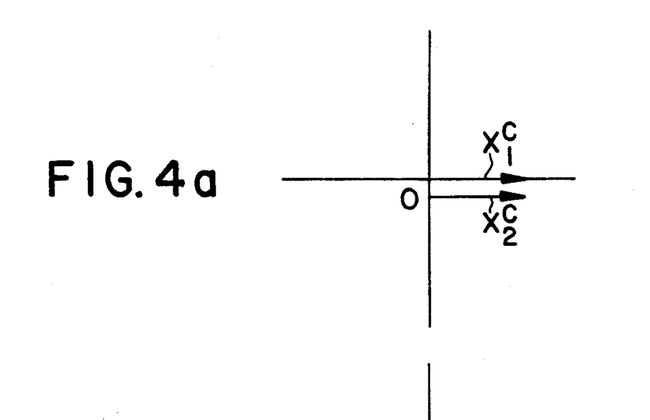
FIGS. 4(a) and 4(b) show phase relations of vectors representative of a complex number before an integration process in the first embodiment of FIG. 1.

The vectors $X_1^c$, $X_2^c$, $X_3^c$ ... have the same amplitude and the same phase when represented by a complex number vector, and, for example, the vectors $X_1^c$ and $X_2^c$ can be shown in FIG. 4(a) by regarding the phase term $e^{j\beta}$ as zero for a phase reference. Hereinafter, the output signal of the phase detector 16 will be indicated by the vector of a complex number for convenience.

On the other hand, with regard to the received pulses (II) $F_1$, $F_3$, ..., input signals $Y_1^c$, $Y_3^c$, ... can be expressed by the following equation similar to $X_1^c$, $X_3^c$, ...

$$Y_1^c = Y_3^c = \ldots = E\, e^{j(\gamma - \Delta\phi)}$$

where:
E = a relative amplitude considering respective losses and gains in the system.

Similarly, with regard to the received pulses (II) $F_2$, $F_4$, ..., input signals $Y_2^c$, $Y_4^c$, ... can be expressed as follows:

$$Y_2^c = Y_4^c = \ldots = E\, e^{j(\gamma + \Delta\phi)}$$

Figure 4B:
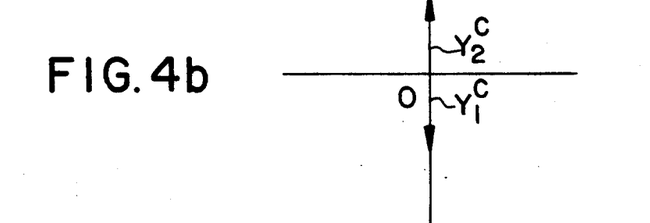

It is noticed that $Y_1^c$, $Y_3^c$, ... and $Y_2^c$, $Y_4^c$, ... are characterized by phase-alternation of $\pm\Delta\phi$ for the received pulses. Therefore, on the assumption that $\Delta\phi = \pi/2$, $Y_1^c$ and $Y_2^c$ can be indicated as shown in FIG. 4(b) with the phase-standard of $e^{j\gamma}$. In the coherent integration process with the same phase, as shown in FIGS. 4(a) and 4(b), addition works on the integrated result for the received pulse train (I) but cancellation works on the integrated result for the received pulse train (II), with zero in integrated pulses of $2n$ (n: integer) and, thus, the second time around signal which is useless can be removed or suppressed. Further, it is desirable to remove a synchronous interference noise which is received after one sweep period delay. Consequently, according to the present invention, it is possible to remove or suppress a useless pulse while performing the integration process for an objective pulse reflected from a target.

Modifications of the first embodiment of FIG. 1 will be described hereinafter. The first modification is conducted by controlling the switcher 6 in a manner reverse from the aforementioned embodiment. Namely, when the transmitted pulse $P_1$ is transmitted, the switcher 6 selects the terminal 7. During the reception period $W_1$ (period $\overline{t_1 t_2}$) associated with the transmitted pulse $P_2$, the switcher 6 selects the terminal 8. Further, during the reception sweep period $W_2$ (period $\overline{t_2 t_3}$) associated with the transmitted pulse $P_3$, the switcher 6 selects the terminal 7, again. After this, such alternative selection continues for every repetition period. In the first modification, contrary to the first embodiment, a complex number vector derived from a target within an unambiguous range is turned out of phase as shown in FIG. 4(b) and, whereas, a complex number vector (a second time around signal) derived from a target in an ambiguous range becomes in the same phase as shown in FIG. 4(a).

Therefore, when the integration circuit 17 performs the coherent integration process in the inphase manner, the vector associated with the target in the ambiguous range (the second time around signal) is added but the vector associated with the target within the unambiguous range is cancelled. As a result, the target distance based on the second time around signal is determined.

Figure 5A:
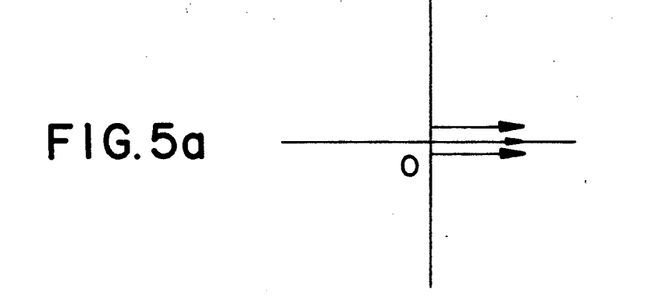
FIGS. 5(a) and 5(b) show phase relations of vectors similar to FIGS. 4(a) and 4(b) according to another embodiment.
Figure 5B:
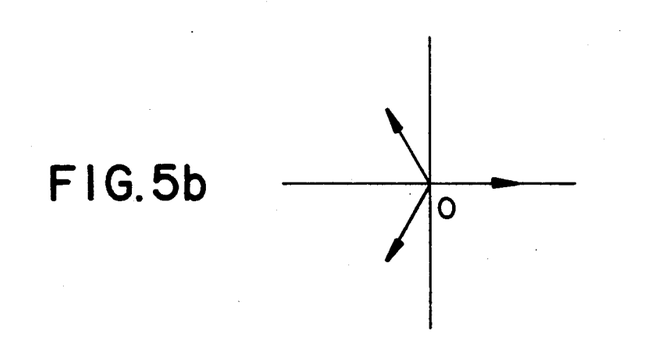

In the first embodiment and its first modification, the local frequency signal is applied to the mixer 14 while applying the two-phase alternation by the switcher 6 using the phase shifter 9. It is possible to perform phase alternation of more than two. The second modification of the aforementioned embodiment, which performs three-phase alternation, will be described below. For example, a three-phase alternation of $O \rightarrow \frac{2}{3}\pi \rightarrow O$ is applied and, thus, the phase sequence of the local frequency signal continues as $O \rightarrow \frac{2}{3}\pi \rightarrow O \rightarrow O \rightarrow \frac{2}{3}\pi \rightarrow O \ldots$ In this case, received pulses located in the reception period associated with the corresponding transmitted pulse become in the same phase relation as shown in FIG. 5(a) in the integration circuit 17. On the other hand, received pulses located in the next reception period have the phase relation as shown in FIG. 5(b). Accordingly, when the coherent integrating process is performed in the inphase manner, the useless second time around signal and the synchronous interferrence signal, which is delayed by one sweep period, are similarly removed or suppressed.

Further, more than three-phase alternation such as four-phase alternation and five-phase alternation is generally feasible for the local frequency signal, and various alternations of phase besides the aforementioned example of $O \rightarrow \pi/2$ and $0 \rightarrow \frac{2}{3}\pi \rightarrow O$ are also possible, if the rotation of vectors is carried out at the input of the integration circuit 17, and a reflected signal from a target within the unambiguous range becomes in the same phase.

Furthermore, in cases where phase alternation of more than (two of the local frequency signal) is applied, by selecting the phase of the local signal after emission of the transmitted pulse, a desired multiple time around signal associated with the selected phase can be selectively extracted in order to detect a target distance.

Figure 6:
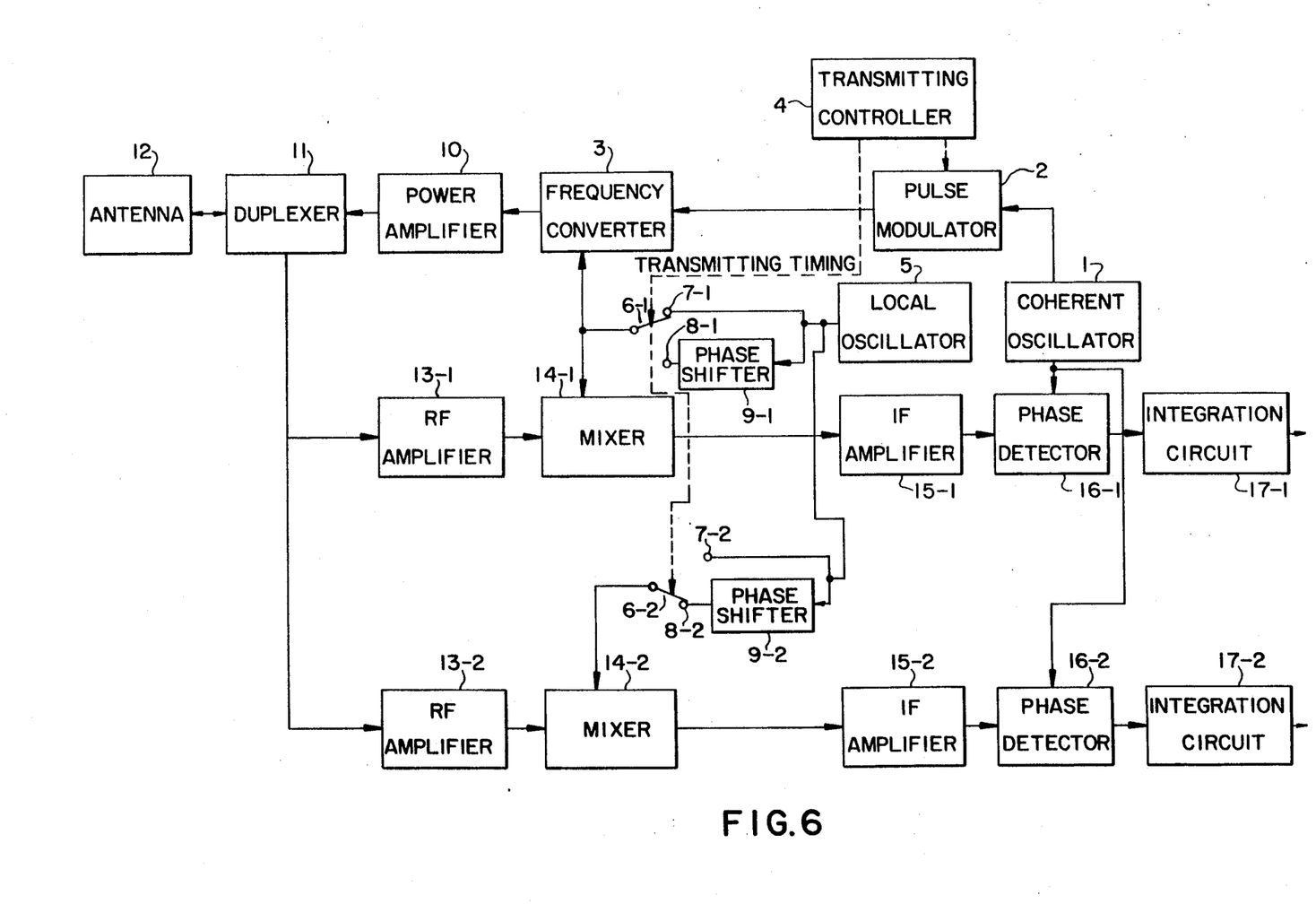
FIG. 6 is a block diagram of a second embodiment according to the present invention.

Next, a second embodiment of the present invention will be described with reference to FIG. 6. As shown in FIG. 6, the second embodiment includes two signal processing circuits in a receiving portion. Since the transmitting portion of FIG. 6 is identical to that of the first embodiment shown in FIG. 1, explanation of the transmitting portion is omitted.

In the receiving portion, a reflected signal from a target is supplied through the antenna 12 and the duplexer 11 to a RF amplifier $13_{-1}$ of the first signal processing circuit and to a RF amplifier $13_{-2}$ of the second signal processing circuit. In the first signal processing circuit, the reflected signal delivered from the RF amplifier $13_{-1}$ is supplied to a mixer $14_{-1}$, together with a local frequency signal delivered from the switcher $6_{-1}$. The local frequency signal is delivered by alternatively selecting the output of the local oscillator 5 and the output of the phase shifter $9_{-1}$ for every reception period. The mixer $14_{-1}$ produces a received IF signal having a subtracted-frequency between the frequencies of the reflected signal and the local frequency signal, while keeping a phase relation therebetween. The received IF signal is supplied through an IF amplifier $15_{-1}$ to a phase detector $16_{-1}$, together with the transmitted IF signal from the coherent oscillator 1.

Similar to the phase detector 16 of FIG. 2, the phase detector $16_{-1}$ delivers complex vectors in accordance with the phase difference between the received IF signal and the transmitted IF signal. Further, the output signals of the phase detector $16_{-1}$ are supplied to an integration circuit $17_{-1}$ which performs a coherent integrating process, as the same as the integration circuit 17 of FIG. 1.

The second signal processing circuit of the receiving portion has a circuit configuration similar to the first signal processing circuit. A difference between the first and second signal processing circuits is that when the switcher $6_{-1}$ selects the terminal $7_{-1}$, the other switcher $6_{-2}$ selects the terminal $8_{-2}$, or vice versa. Accordingly, phase-different local frequency signals are alternatively supplied to the mixers $14_{-1}$ and $14_{-2}$.

Operation of the second embodiment shown in FIG. 6 will be described below. In this case, the time relation between the transmitted pulses and the received pulses is identical to that in the first embodiment, which is indicated in FIG. 3. In FIG. 6, assuming that the switcher $6_{-1}$ selects the terminal $7_{-1}$ during the period $\overline{t_1 t_2}$ associated with transmission of pulse $P_1$ and the terminal $8_{-1}$ during the period $t_2 t_3$, associated with transmission of pulse $P_2$ and such sequence follows for every transmitted pulse, voltages $V_1$ and $V_2$ corresponding to transmitted pulses $P_1$ and $P_2$ are expressed as follows:

$$V_1 = A\, e^{j(\omega t + \alpha)}$$

$$V_2 = A\, e^{j(\omega t + \alpha - \Delta\phi)}$$

where:
A = an amplitude of the transmitted pulse, $\omega$ = angular frequency, $\alpha$ = a phase of the transmitted pulse to a reference phase, and $\Delta\phi$ = delay of the phase shifter $9_{-1}$ and $9_{-2}$.

Further, voltages $V_3$ and $V_4$ are expressed as follows:

$$V_1 = V_3 = \ldots$$

$$V_2 = V_4 = \ldots$$

Therefore, in FIG. 6, the phases of the received pulse train (I) and the received pulse train (II) at the input of the mixers $14_{-1}$ and $14_{-2}$ are identical to that in the first embodiment of FIG. 1.

Next, the operations of the first and second signal processing circuits up to the integration circuits $17_{-1}$ and $17_{-2}$ will be explained. With regard to the first signal processing circuit, the received pulse trains (I) and (II) are processed the same as that in the first embodiment. Therefore, the input signals to the integration circuit $17_{-1}$ are expressed as follows:

for the received pulse train (I) $S_1, S_2, \ldots$ $$X_1^c = X_2^c = X_3^c = \ldots = D\, e^{j\beta}$$

for the received pulse train (II) $F_1, F_2, \ldots$ $$Y_1^c = Y_3^c = \ldots = E\, e^{j(\gamma - \Delta\phi)}$$

$$Y_2^c = Y_4^c = \ldots = E\, e^{j(\gamma + \Delta\phi)}$$

With regard to the second signal processing circuit, the received pulse trains (I) and (II) are processed the same as that of the first modification of the first embodiment. Therefore, the input signals to the integration circuit $17_{-2}$ are expressed as follows:

for the received pulse train (I) $S_1, S_2, \ldots$ $$X_1^c = X_3^c = \ldots = D\, e^{j(\beta - \Delta\phi)}$$

$$X_2^c = X_4^c = \ldots = D\, e^{j(\beta + \Delta\phi)}$$

for the received pulse train (II) $F_1, F_2, \ldots$ $$Y_1^c = Y_2^c = Y_3^c = \ldots = E\, e^{j\gamma}$$

Accordingly, after the coherent integration process, the integration circuit $17_{-1}$ delivers a reflected signal in the unambiguous range and, on the other hand, the integration circuit $17_{-2}$ delivers a reflected signal in the ambiguous range associated with the second time around signal. As a result, the second embodiment of the present invention as shown in FIG. 6 is capable of removing or compressing the distance ambiguity while enabling the integration process for every transmitted pulse.

Figure 7:
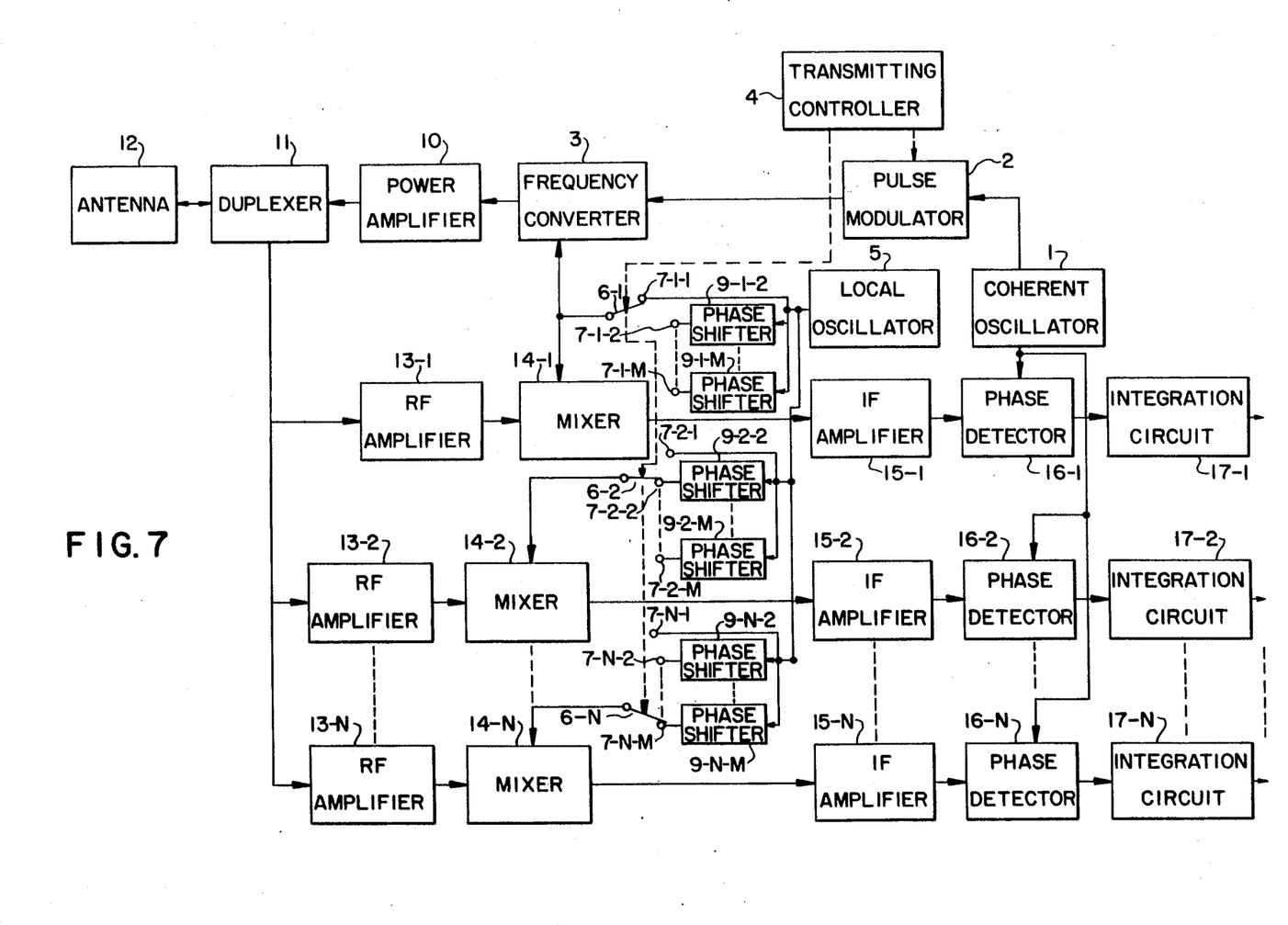
FIG. 7 is a block diagram of a third embodiment according to the present invention.

In the second embodiment shown in FIG. 6, the phase-alternation of the local frequency signal is two-phases. It is further possible to increase the number of phases of the phase-alternation. FIG. 7 shows a third embodiment of the present invention where the phase-alternation of the local frequency signal is broadly increased as M phase-alternation. Further, in this embodiment, N (N≦M) signal processing circuits are contained in the receiving portion. Therefore, each signal processing circuit has M phase shifters having different delay phases.

In the third embodiment of FIG. 7, transmitted pulses are emitted while a switcher $6_{-1}$ sequentially selects terminals $7_{-1-1}$ to $7_{-1-M}$ and, thus, the phases of the transmitted pulses are alternated during the M repetition periods. On the other hand, in the first signal processing circuit of the receiving portion, the switcher $6-1$ supplies the local signal sequentially delivered from the terminals $7_{-1-1}$ to $7_{-1-M}$ to the mixer $14_{-1}$ in synchronism with the transmitting operation. Further, in the second signal processing circuit of the receiving portion, a switcher $6_{-2}$ sequentially selects one of terminals in the order of $7_{-2-2}$ to $7_{-2-M}$ to $7_{-2-1}$ to supply the local frequency signal to the mixer $14_{-2}$. Similarly, as shown in FIG. 7, each switcher $6_{-i}$ (i=1, 2, ..., N) of each signal processing circuit selects a different terminal among the M terminals. Finally, a switcher $6_{-N}$ of the N-th signal processing circuit selects a terminal in the order of $7_{-N-M}$ to $7_{-N-1}$ and to $7_{-N-(M-1)}$.

Consequently, the same as the second embodiment of FIG. 6, the integration circuit $17_{-1}$ of the first signal processing circuit obtains the target reflected signal in the unambiguous range, and the integration circuit $17_{-2}$ of the second signal processing circuit obtains the target reflected signal associated with the second time around signal. Similarly, an integration circuit $17_{-i}$ of the i-th signal processing circuit obtains a target reflected signal associated with the N-th time around signal. As a result, the third embodiment of FIG. 7 has a great advantage to remarkably overcome the distance ambiguity of the conventional radar system.

Figure 8:
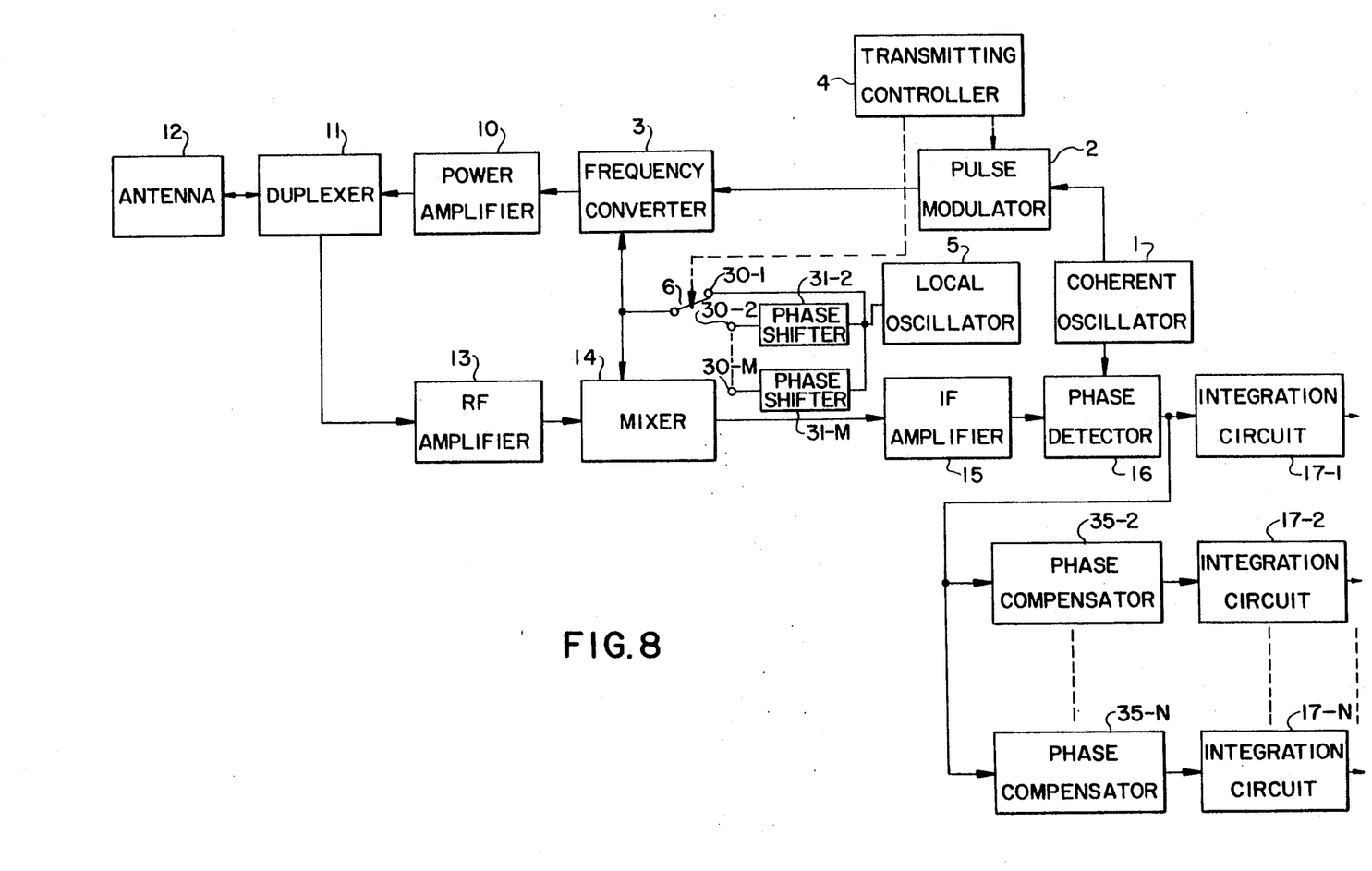
FIG. 8 is a block diagram of a fourth embodiment according to the present invention.

Next, a fourth embodiment of the present invention will be described with reference to FIG. 8. The fourth embodiment is characterized by eliminating circuit configurations from the RF amplifiers 13 to the phase detectors 16 of the second to the N-th signal processing circuits contained in the third embodiment of FIG. 7 and, instead, providing phase compensators $35_{-2}$ to $35_{-N}$, as shown in FIG. 8. Therefore, the fourth embodiment of FIG. 8 is advantageously simplified in comparison with FIG. 7. In FIG. 8, the transmitting operation and the signal processing up to the integration circuit of the receiving portion is identical to that of the third embodiment shown in FIG. 7.

The phase compensator $35_{-2}$ of the second signal processing circuit receives the vectors representative of complex numbers from the phase detector 16 and phase-rotates these vectors by delaying the vectors by a predetermined phase difference such that the received pulses have the same phase rotation with regard to the second time around signal. In this case, the predetermined phase delay corresponds to a phase difference between the phase of a pulse transmitted prior to a previous reception period to the present one and the phase of a transmitted pulse prior to the present reception period and, in other words, between the transmitted pulse phase associated with the previous reception period and the transmitted pulse phase associated with the present reception period. Therefore, the phase compensator $35_{-2}$ delivers the phase-compensated complex number vectors corresponding to the target reflected signal based on the second time around signal. Similarly, phase compensators $35_{-N}$ compensate the received complex numbers vectors in accordance with respective phase differences and delivers the phase-compensated vectors corresponding to the target reflected signal based on the N-th time around signals. In FIG. 8, the operations of the integration circuits $17_{-1}$ to $17_{-N}$ are identical to that in FIG. 7.

Figure 9:
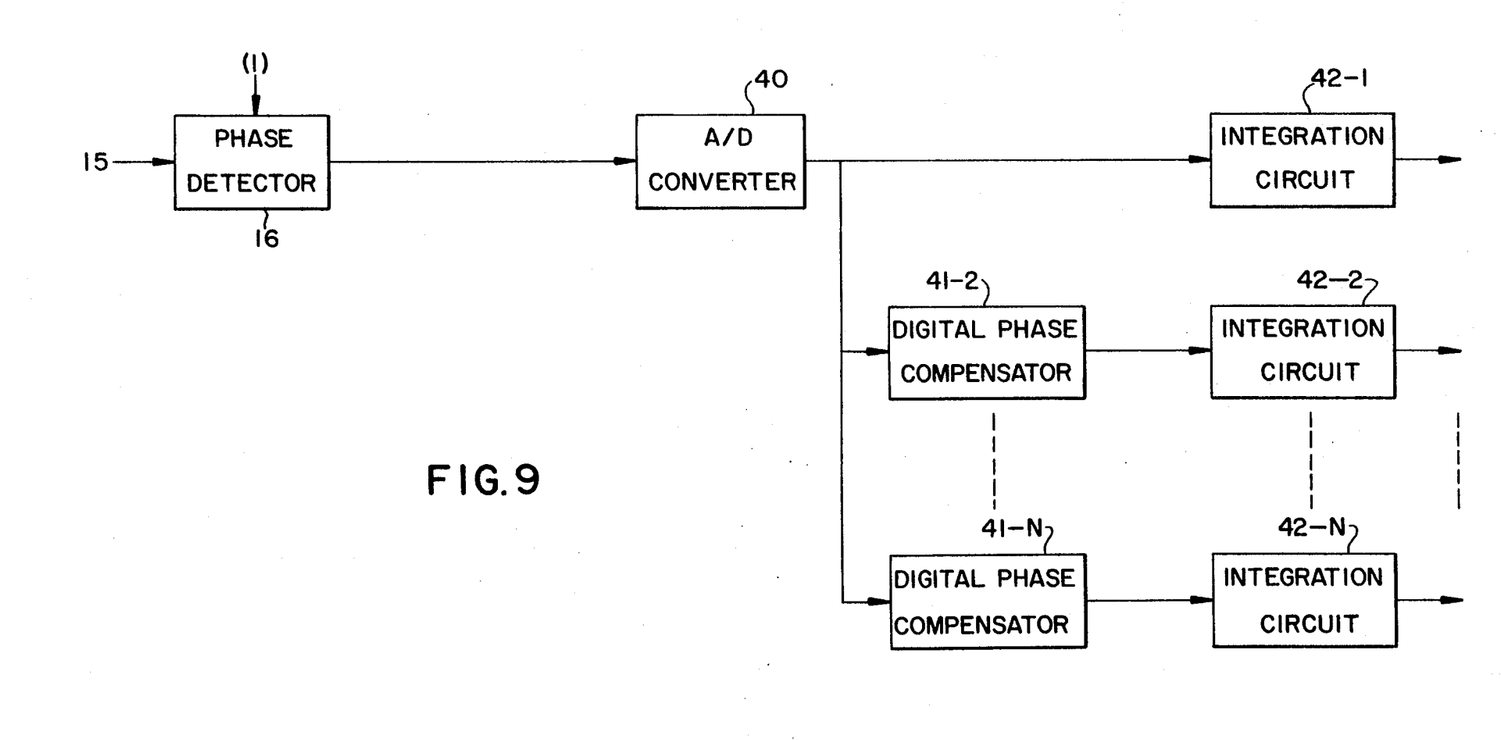
FIG. 9 is a block diagram of a modification of the fourth embodiment shown in FIG. 8.

A modification of the fourth embodiment will be further described with reference to FIG. 9. In this modification shown in FIG. 9, the output signals of the phase detector 16 are converted into digital signals by an A/D converter 40. The digital signals from the A/D converter 40 are directly supplied to a digital integration circuit $42_{-1}$ for the target reflected in the unambigious range. The digital signals from the A/D converter 40 are also supplied to digital phase compensators $41_{-2}$ to $41_{-N}$ of the second to N-th signal processing circuits, and digital integration circuits $42_{-2}$ to $42_{-N}$ perform the coherent integration process to deliver target reflected signals based on the second to N-th time around signals, respectively.

As described above, in the second, third and fourth embodiments of the present invention, the integration circuits perform the coherent integration operation to obtain the target reflected signals associated with the desired multiple time around signals while removing or suppressing useless signals associated with the other multiple time around signals.

Figure 10:
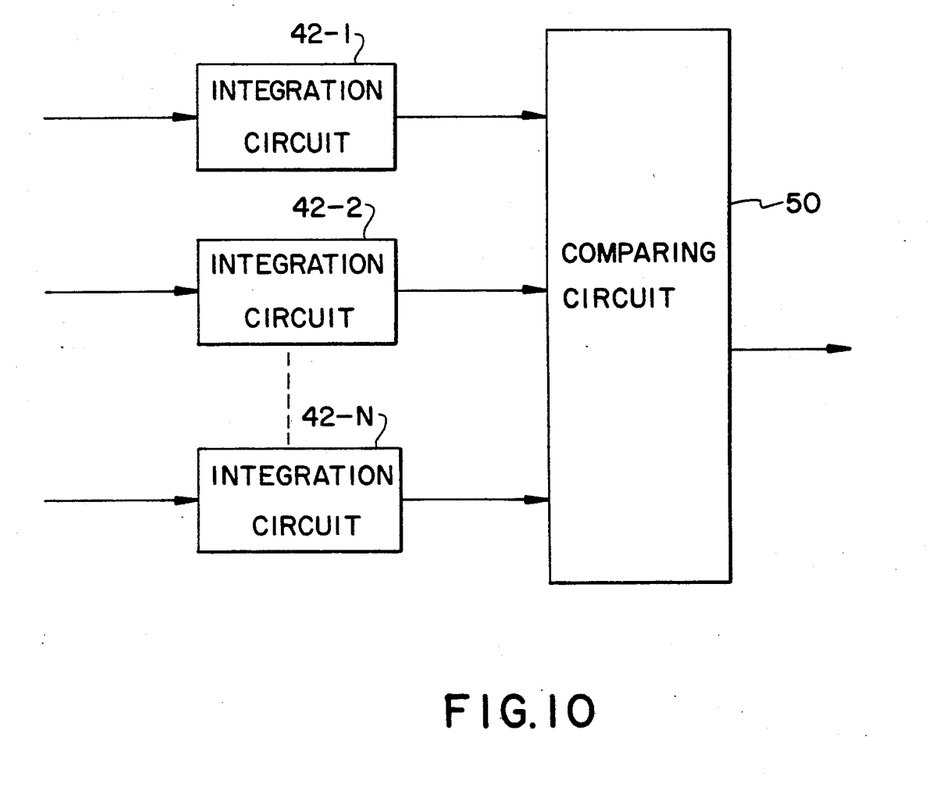
FIG. 10 is a partial block diagram of a fifth embodiment according to the present invention.
Figure 11:
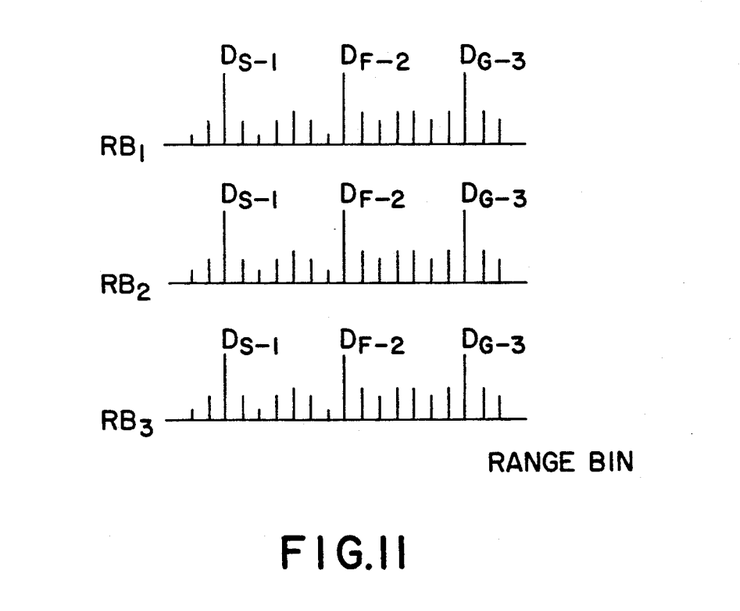
FIG. 11 shows outputs of integration circuits of FIG. 10 for explaining the operation of the fifth embodiment.

A fifth embodiment of the present invention is provided to apply comparison operation among the outputs of respective integration circuits. FIG. 10 shows a block diagram of the fifth embodiment which is a partial block after the integration operation. In FIG. 10, the integration circuits $42_{-1}$ to $42_{-N}$ deliver respective integrated signals indicated by pulsive shapes positioned at respective range bins as shown in FIG. 11. In FIG. 11, $RB_1$ indicates the integrated signal delivered from the integration circuit $42_{-1}$ and, further, $RB_2$ and $RB_3$ are the integrated signals delivered from the integration circuits $42_{-2}$ and $42_{-3}$, which are obtained on the basis of the second and third time around signals, respectively.

Particularly, the signals $RB_1$, $RB_2$ and $RB_3$ contain certain return signals $D_{S-1}$, $D_{F-2}$ and $D_{G-2}$ obtained by the integration process and, as shown in FIG. 11, the return signal $D_{S1}$ in the signal $RB_1$, the return signal $D_{F-2}$ in the signal $RB_2$ and the return signal $D_{G-2}$ in the signal $RB_3$ have the greatest amplitudes in comparison with each other.

Therefore, a comparing circuit 50 in FIG. 10 compares the output signals from the integration circuits $42_{-1}$ to $42_{-N}$ in amplitude, at every range bin and selects the reflected signal having the greatest amplitude as an objective radar reflected signal. Furthermore, by considering the order number of the multiple time around signals, the comparing circuit 50 accordingly determines a target distance.

In the aforementioned embodiments, the integration circuit performs the integration process by merely adding complex number vectors after the phase detection operation. Further, it is more preferable to adopt a pulse-doppler process to the aforementioned embodiments in order to improve extraction capability for a moving target. In the pulse-doppler process, the target detection is carried out by discriminating outputs of respective bands of doppler filters in accordance with a target velocity.

Figure 12:
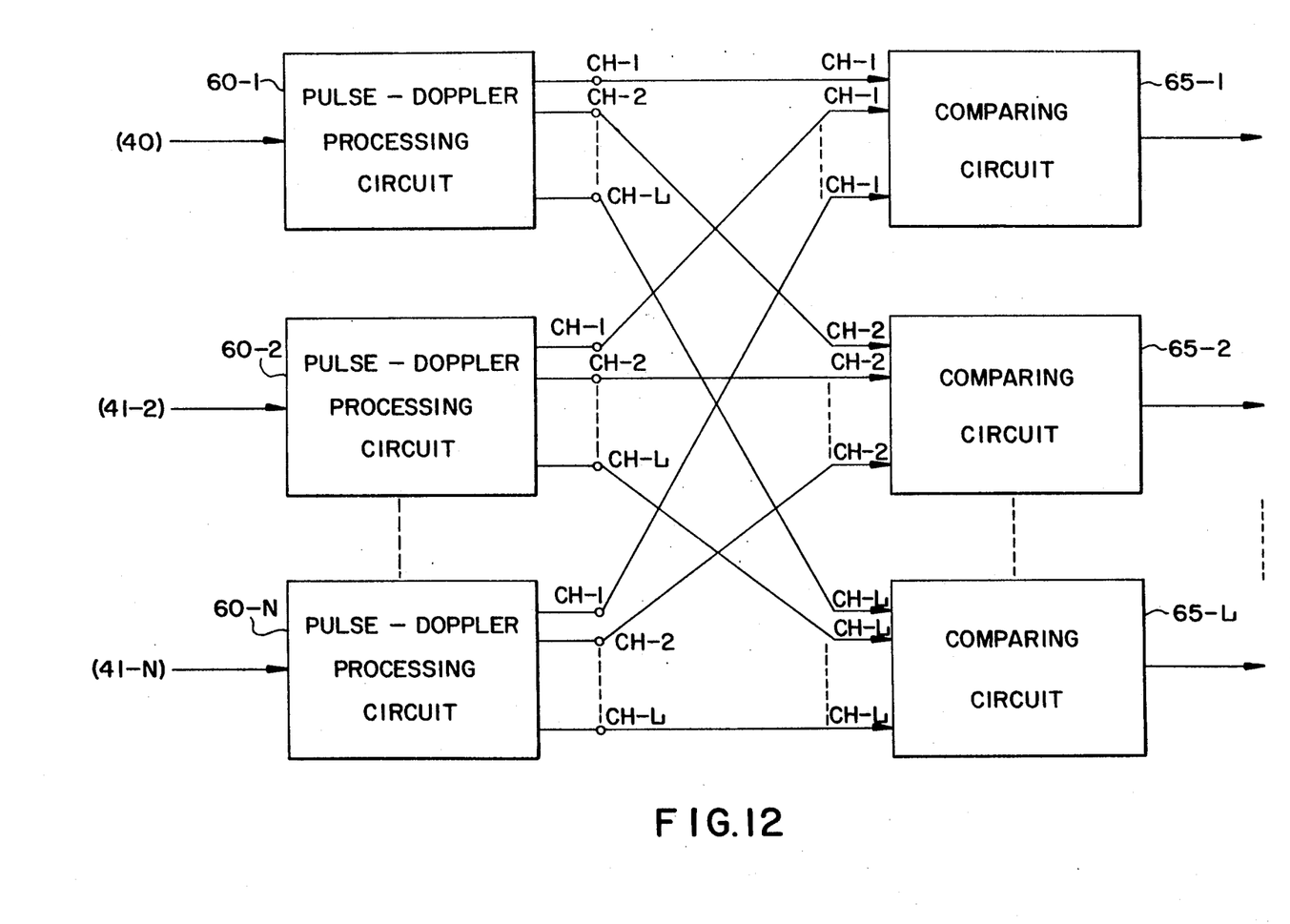
FIG. 12 is a partial block diagram of a sixth embodiment according to the present invention.

FIG. 12 shows a partial block diagram of a sixth embodiment of the present invention which applies the pulse-doppler process as an integration process. In FIG. 12, pulse-doppler processing circuits $60_{-1}$ to $60_{-N}$ receive phase detection signals of the first signal processing circuit to the N-th signal processing circuit and each discriminates L bands (L: integer) to deliver output signals of L channels (CH 1 to CH L). An amplitude comparing circuit $65_{-1}$ receives output signals of the first channels (CH 1) from all of the pulse-doppler processing circuits $60_{-1}$ to $60_{-N}$ and, similarly, amplitude comparing circuits $65_{-2}, \ldots, 65_{-L}$ receive output signals of the second channels (CH 2), ..., the L-th channels (CH L) from all of the circuits $60_{-1}$ to $60_{-N}$, respectively. Accordingly, the amplitude comparing circuits $65_{-1}$ to $65_{-L}$ deliver distance-determined target detection signals in each range bin for the respective channels (CH 1 to CH L) because the output signals for each channel are representative of signals which are coherent-integrated in accordance with a doppler frequency.

As described above, according to the present invention, the coherent pulse radar system is obtained with features capable of efficiently realizing coherent integration operation and of determining a target distance on the basis of the multiple time around signal, while transmitting radar pulses with phase alternation, and while phase-detecting the reflected signal under the respective phase references associated with the transmitted pulses, in a plurality of signal processing receiving circuits.

What is claimed is:

1. A coherent pulse radar system using radar pulses having a successive phase relationship between adjacent pulses of said radar pulses, said coherent pulse radar system comprising:

a coherent oscillator for generating a coherent signal;

a pulse modulator means for pulse-modulating said coherent signal to produce a modulated coherent signal;

a local oscillator for generating a local high frequency signal;

a phase shifter for phase-shifting a phase of said local high frequency signal by a predetermined amount to produce a phase-shifted local high frequency signal;

selecting means for selecting said local high frequency signal or said phase-shifted local high frequency signal;

a frequency converting means for frequency-converting said modulated coherent signal to said radar pulses by mixing said modulated coherent signal with a first output of said selecting means;

transmitting means, coupled to said frequency converting means, for transmitting said radar pulses;

receiving means for receiving received radar pulses;

a first mixer for mixing said received radar pulses with said first output of said selecting means to produce a first IF received signal;

a second mixer for mixing said received radar pulses with a second output of said selecting means to produce a second IF received signal;

a first phase detector for phase-detecting said first IF received signal with reference to said coherent signal to produce a first phase-detected signal;

a second phase detector for phase-detecting said second IF received signal with reference to said coherent signal to produce a second phase-detected signal;

first integration means for integrating said first phase-detected signal to obtain a first target signal associated with an unambiguous range; and second integration means for integrating said second phase-detected signal to obtain a second target signal associated with an ambiguous range.

2. A coherent pulse radar system using radar pulses having a successive phase relationship between adjacent pulses of said radar pulses, said coherent pulse radar system comprising:

a coherent oscillator for generating a coherent signal;

a pulse modulator means for pulse-modulating said coherent signal to produce a modulated coherent signal;

a local oscillator for generating a local high frequency signal;

phase-shifting means for phase-shifting a phase of said local high frequency signal to deliver a plurality of phase-shifted local high frequency signals having respective phase-shifts;

first selecting means for sequentially selecting one of said plurality of phase-shifted local high frequency signals;

generating means for generating said radar pulses by frequency-mixing said modulated coherent signal with an output of said first selecting means;

transmitter means, coupled to said generating means, for transmitting said radar pulses;

receiving means for receiving reflected radar pulses to generate received radar pulses;

a first mixer for mixing said received radar pulses with said output of said first selecting means to produce a first IF received signal;

second selecting means for sequentially selecting one of said plurality of phase-shifted local high frequency signals, said first and second selecting means being switched in synchronism with one another;

a second mixer for mixing said received radar pulses with an output of said second selecting means to produce a second IF received signal;

a first phase detector for phase-detecting said first IF received signal with reference to said coherent signal to produce a first phase-detected signal;

a second phase detector for phase-detecting said second IF received signal with reference to said coherent signal to produce a second phase-detected signal;

first integration means for integrating said first phase-detected signal to obtain a first target signal associated with an unambiguous range; and second integration means for integrating said second phase-detected signal to obtain a second target signal associated with an ambiguous range.

3. A coherent pulse radar system using radar pulses having a successive phase relationship between adjacent pulses of said radar pulses, said coherent pulse radar system comprising:

a coherent oscillator for generating a coherent signal;

pulse modulator means for pulse modulating said coherent signal to produce a modulated coherent signal;

a local oscillator for generating a local high frequency signal;

a phase shifter for phase-shifting a phase of said local high frequency signal by a predetermined amount to produce a phase-shifted local high frequency signal;

selecting means for selecting said local high frequency signal or said phase-shifted local high frequency signal;

generating means for generating said radar pulses by mixing said modulated coherent signal with an output of said selecting means;

transmitting means, coupled to said generating means, for transmitting said radar pulses;

receiving means for receiving received radar pulses;

a mixing means for mixing said received radar pulses with said output of said selecting means to produce an IF received signal;

a phase-detecting means for phase-detecting said IF received signal with reference to said coherent signal to produce a phase-detected signal;

phase-rotating means for rotating a signal phase of said phase-detected signal in accordance with a phase-difference specified by said phase shifter to produce a phase-compensated signal;

a first integrating means for integrating said phase-detected signal to obtain a first target signal associated with an unambiguous range; and a second integrating means for integrating said phase-compensated signal to obtain a second target signal associated with an ambiguous range.

* * * * *